(12) United States Patent
Zielinski et al.

(10) Patent No.: US 11,047,277 B2
(45) Date of Patent: Jun. 29, 2021

(54) METHOD AND SYSTEMS FOR PARTICULATE MATTER CONTROL

(71) Applicant: Transportation IP Holdings, LLP, Norwalk, CT (US)

(72) Inventors: David Zielinski, Erie, PA (US); Shishir Tiwari, Buffalo Grove, IL (US); James Robert Mischler, Erie, PA (US); Michael Mangus, Raleigh, NC (US); Matthew Hart, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/403,384

(22) Filed: May 3, 2019

(65) Prior Publication Data

US 2019/0345858 A1    Nov. 14, 2019

Related U.S. Application Data

(60) Provisional application No. 62/669,245, filed on May 9, 2018.

(51) Int. Cl.
| | |
|---|---|
| *F01N 3/00* | (2006.01) |
| *F01N 3/08* | (2006.01) |
| *F02D 41/02* | (2006.01) |
| *F02D 41/14* | (2006.01) |
| *F02D 41/22* | (2006.01) |

(52) U.S. Cl.
CPC ....... *F01N 3/0842* (2013.01); *F02D 41/0275* (2013.01); *F02D 41/148* (2013.01); *F02D 41/1441* (2013.01); *F02D 41/1456* (2013.01); *F02D 41/1474* (2013.01); *F02D 41/221* (2013.01)

(58) Field of Classification Search
CPC ............. F02D 41/1456; F02D 2200/10; F02D 41/401; F02D 41/402; F02D 41/40; F01N 2560/025
USPC .......................................................... 60/277
See application file for complete search history.

(56) References Cited

U.S. PATENT DOCUMENTS

| | | | | |
|---|---|---|---|---|
| 6,055,808 | A * | 5/2000 | Poola | F02B 37/105 60/274 |
| 6,161,519 | A * | 12/2000 | Kimura | F02D 35/026 123/299 |
| 6,370,870 | B1 * | 4/2002 | Kamijo | F01N 3/0842 60/286 |
| 8,904,759 | B2 | 12/2014 | Heverley, III et al. | |
| 9,228,511 | B2 * | 1/2016 | Zhu | F02D 41/0072 |
| 2002/0170287 | A1 * | 11/2002 | Hirota | F01N 3/0871 60/277 |
| 2003/0145581 | A1 * | 8/2003 | Tashiro | F02D 41/403 60/286 |
| 2007/0119418 | A1 * | 5/2007 | Kojima | F02D 35/028 123/305 |

(Continued)

*Primary Examiner* — Jason D Shanske
(74) *Attorney, Agent, or Firm* — McCoy Russell LLP

(57) ABSTRACT

Various methods and systems are provided for controlling emissions. In one example, a controller is configured to respond to a sensed exhaust oxygen concentration by changing a fuel injection timing to maintain particulate matter (PM) within a range, and then adjusting an exhaust gas recirculation (EGR) amount based on NOx sensor output and based on the change in fuel injection timing.

8 Claims, 7 Drawing Sheets

(56) References Cited

U.S. PATENT DOCUMENTS

| | | | |
|---|---|---|---|
| 2011/0099982 A1* | 5/2011 | Berke | F01N 11/002 |
| | | | 60/277 |
| 2011/0126516 A1 | 6/2011 | Gallagher et al. | |
| 2012/0253644 A1* | 10/2012 | Port | F02M 26/15 |
| | | | 701/109 |
| 2014/0041384 A1* | 2/2014 | Mischler | F02D 41/0007 |
| | | | 60/605.2 |
| 2014/0360477 A1* | 12/2014 | Doering | F02D 41/0087 |
| | | | 123/673 |
| 2016/0069286 A1* | 3/2016 | Zielinski | F02D 41/0077 |
| | | | 123/445 |
| 2017/0152806 A1* | 6/2017 | Mischler | F02D 41/0002 |
| 2017/0234252 A1* | 8/2017 | Uesugi | F02D 41/0007 |
| | | | 701/105 |
| 2017/0254286 A1 | 9/2017 | Primus et al. | |
| 2018/0274462 A1* | 9/2018 | Ujihara | F02D 41/403 |

* cited by examiner

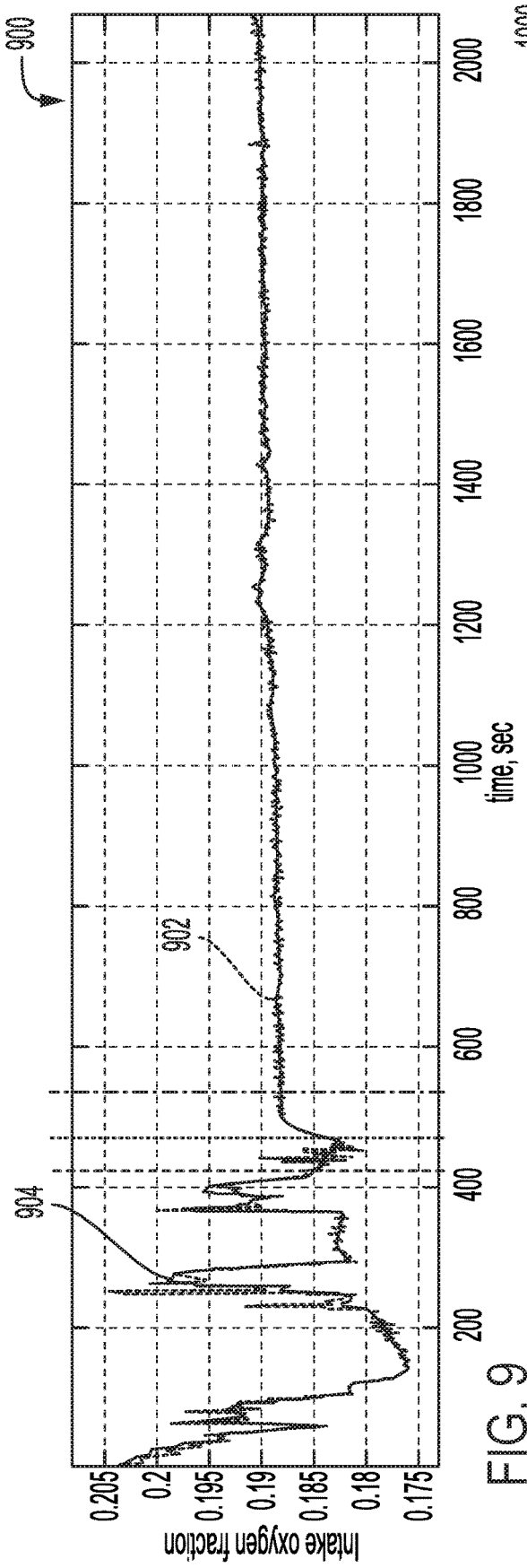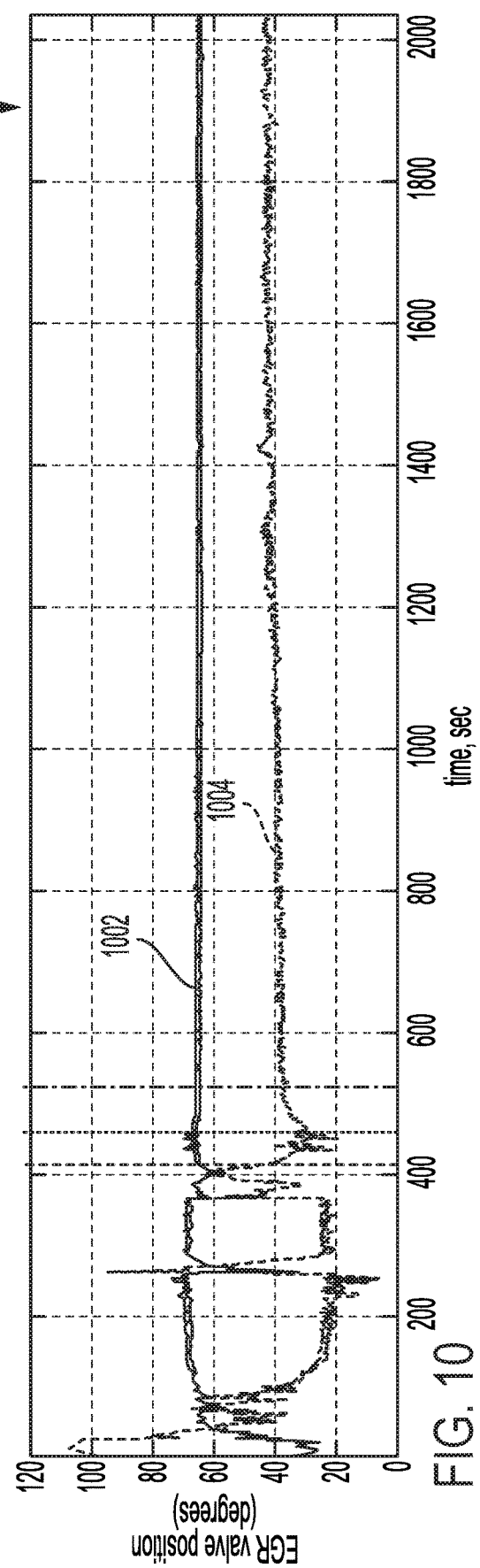

METHOD AND SYSTEMS FOR PARTICULATE MATTER CONTROL

CROSS REFERENCE TO RELATED APPLICATIONS

The present application claims priority to U.S. Provisional Application No. 62/669,245 entitled "METHOD AND SYSTEMS FOR PARTICULATE MATTER CONTROL" filed May 9, 2018. The entire contents of the above-listed application are hereby incorporated by reference for all purposes.

BACKGROUND

Technical Field

Embodiments of the subject matter disclosed herein relate to engine control. Other embodiments relate to controlling emissions in engine exhaust gas.

Discussion of Art

Engine systems may be configured to maintain emissions within regulated limits while providing optimal fuel economy. However, over time, engine components may begin to degrade or otherwise change in performance. Before the degradation of the components is detected and the components serviced or replaced, emissions may start to increase.

BRIEF DESCRIPTION

In one embodiment, a controller is configured respond to a sensed exhaust oxygen concentration by changing a fuel injection timing to maintain particulate matter (PM) within a range, and then adjusting an exhaust gas recirculation (EGR) amount based on NOx sensor output and based on the change in fuel injection timing to maintain NOx emissions.

BRIEF DESCRIPTION OF THE DRAWINGS

FIGS. 5-10 show example operating parameters that may be observed during execution of the method of FIG. 3.

DETAILED DESCRIPTION

The following description relates to embodiments for maintaining engine system exhaust emissions, such as particulate matter (PM) and NOx, within respective ranges. A variety of engine operating parameters, including fuel injection timing, intake oxygen fraction, intake air flow rate (and hence air flow through a turbocharger), intake manifold temperature, and engine air-fuel ratio may impact the production of engine-out emissions. To respond to such changing operating parameters to keep the emissions within range, a controller may be configured to change a fuel injection timing based on sensed exhaust oxygen concentration to maintain PM within range. Further, the adjustment to the fuel injection timing may change the level of NOx in the exhaust gas level, and thus the controller may also be configured to change an exhaust gas recirculation (EGR) amount to maintain NOx within a range. The EGR amount may be adjusted by adjusting an exhaust valve position, for example.

Figure 1:
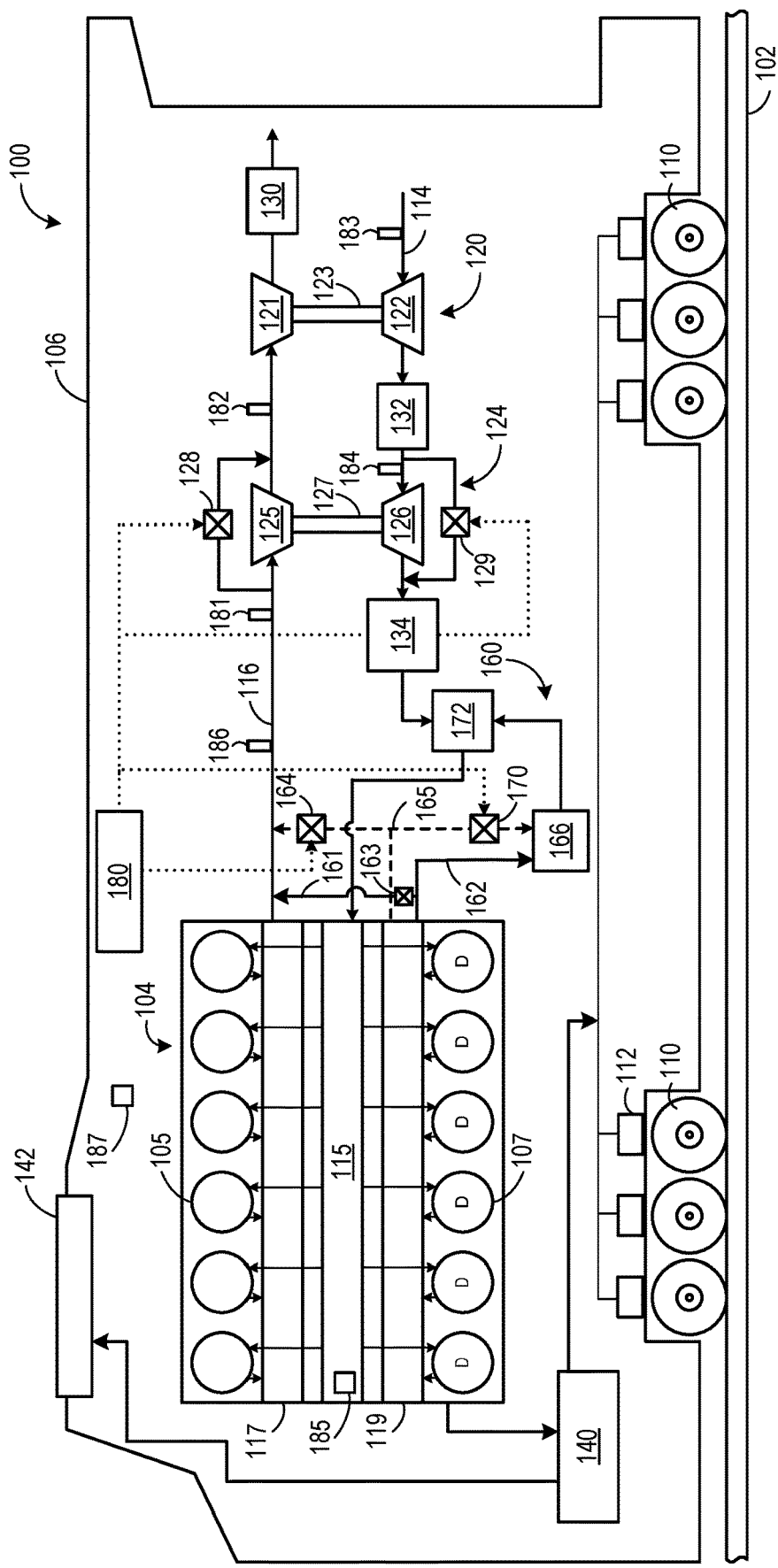
FIG. 1 shows a schematic diagram of a vehicle according to an embodiment of the present disclosure.
Figure 2:
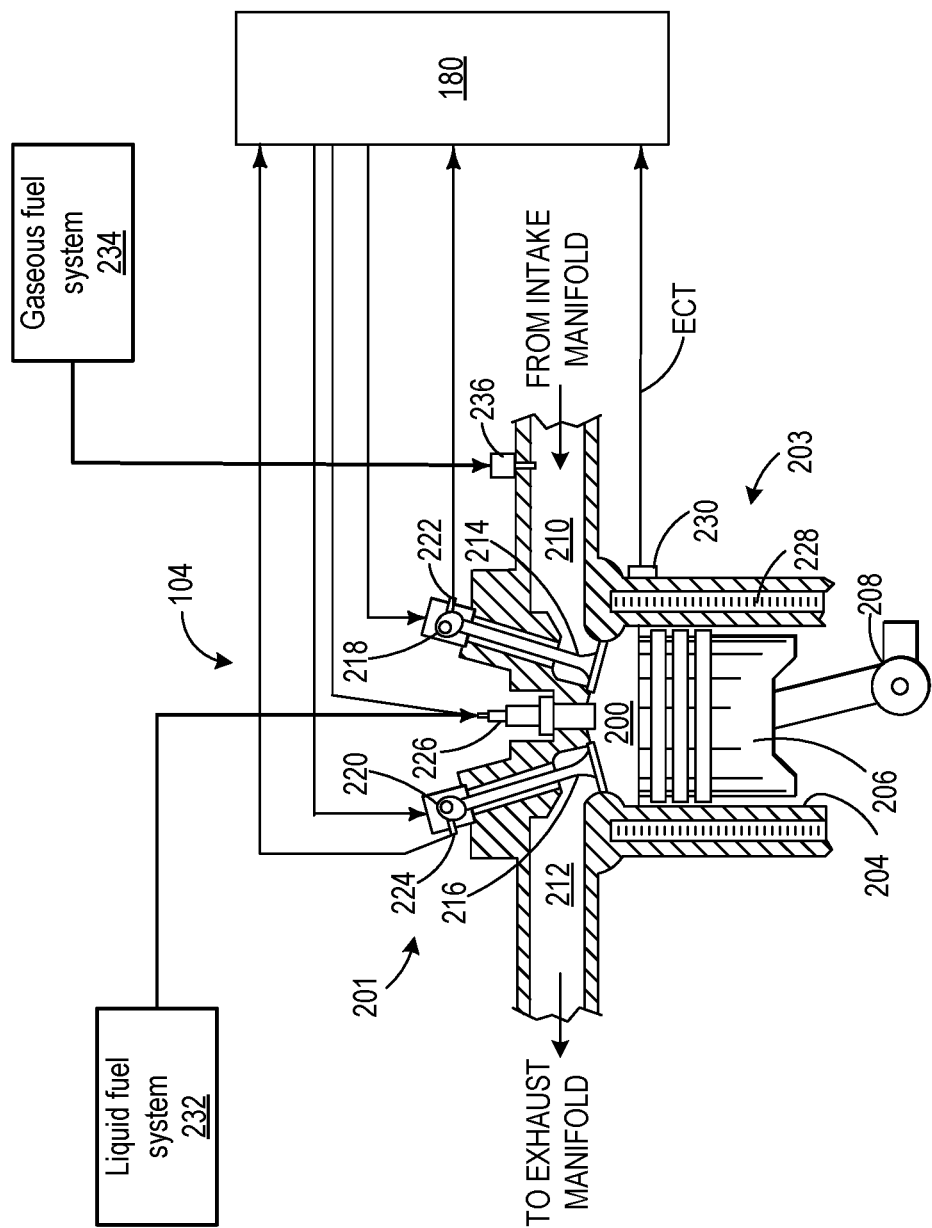
FIG. 2 schematically shows a cylinder of an engine that may be included in the vehicle of FIG. 1.

An example system for an engine installed in a vehicle, including a controller, is illustrated in FIG. 1. A cylinder of the engine is illustrated in FIG. 2. The controller may be configured to carry out the method illustrated in FIG. 3 in order to adjust engine operating parameters, such as EGR amount and fuel injection timing, based on exhaust oxygen concentration, for example. FIG. 4 illustrates a control diagram for adjusting fuel injection timing based on exhaust oxygen concentration, and then further adjusting an EGR amount based on the fuel injection timing adjustment. In some examples, the EGR amount may be further adjusted based on an output (e.g., feedback signal) from a NOx sensor. FIGS. 5-10 show example operating parameters that may be measured or commanded during the execution of the method of FIG. 3 and/or the control diagram of FIG. 4.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for maintaining exhaust emissions within range, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold, the exhaust passage, and the like. Exhaust gas flows through the exhaust passage, and out of an exhaust stack of the rail vehicle.

In one example, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further examples, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., NOR).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves are normally open such and the other is normally closed. In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers 1 in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve.

The vehicle system further includes an exhaust treatment system 130 coupled in the exhaust passage in order to reduce regulated emissions. As depicted in FIG. 1, the exhaust gas treatment system is disposed downstream of the turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a NOx trap, and/or various other emission control devices or combinations thereof. In some examples, the exhaust treatment system may be omitted.

The vehicle system further includes the control unit 180 (also referred to as a controller), which is provided and configured to control various components related to the vehicle system. In one example, the control unit includes a computer control system. The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Further, the control unit may receive signals from intake sensor 185, which may include one or more sensors for measuring intake manifold pressure, intake manifold pressure, or other parameters, exhaust sensor 186, which may include one or more sensors for measuring exhaust oxygen, exhaust NOx, exhaust particulate matter, or other parameters, and ambient sensor 187, which may include one or more sensors for measuring ambient temperature, ambient pressure, ambient humidity (specific and/or relative), or other parameters. As used herein, ambient may refer to conditions of the air external to the engine system, which may include air outside the vehicle, air inside the vehicle, and/or air that is inducted into the engine. Correspondingly, the control unit may control the vehicle system by sending commands to various components such as traction motors, alternator, cylinder valves, throttle, heat exchangers, wastegates or other valves or flow control elements, etc.

FIG. 2 depicts an embodiment of a combustion chamber, or cylinder 200, of engine 104. The cylinder may be capped by a cylinder head 201. The cylinder head houses the intake and exhaust valves and liquid fuel injector, described below, and is coupled to a cylinder block 203 forming the cylinder.

The engine may be controlled at least partially by a control system including a controller (e.g., such as the controller shown by FIG. 1 and described above) which may be in further communication with a vehicle system including the engine, such as the locomotive described above with reference to FIG. 1. As described above, the controller may further receive signals from various engine sensors including, but not limited to, engine speed, engine load, boost pressure, ambient pressure, turbocharger speed, ambient pressure, CO2 levels, exhaust temperature, NOx emission, engine coolant temperature (ECT) from temperature sensor 230 coupled to cooling sleeve 228, or the like. Correspondingly, the controller may control the vehicle system by sending commands to various components such as alternator, cylinder valves, throttle, fuel injectors, or the like.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger (not shown in FIG. 2) and to atmosphere, via an exhaust manifold. The exhaust passage may further receive exhaust gases from other cylinders of the engine in addition to the cylinder shown by FIG. 2, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head. In yet another embodiment, the engine may not include any poppet valves.

The intake valve may be controlled by the controller via an intake valve actuator 218. Similarly, the exhaust valve may be controlled by the controller via an exhaust valve actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example. In yet another example, the intake and exhaust valves shown in FIG. 2 may be mechanically actuated via a rotating camshaft and valvetrain to control opening and closing the valves. In this way, the intake valve actuator and exhaust valve actuator may be in the form of a camshaft and valvetrain.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

Each cylinder of the engine is coupled with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a common fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, or the like, located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders.

The vehicle system may be configured to maintain engine out emissions below regulated limits over a wide range of ambient conditions, while providing optimum fuel efficiency. For example, particulate matter (PM) emissions may be maintained by adjusting an intake air flow rate. However, the PM output of the engine increases as engine components wear, due to fuel injector aging for example. The increase in PM emissions as the components wear is accompanied by a concurrent decrease in exhaust oxygen concentration. Thus, by keeping the oxygen content out of the engine above a certain limit, PM emissions may be maintained.

According to embodiments disclosed herein, engine timing (e.g., fuel injection timing) may be adjusted to maintain an exhaust oxygen reading near a target oxygen concentration while simultaneously adjusting an EGR rate. This strategy may reduce the PM output of the engine while maintaining a constant NOx. For example, if the exhaust oxygen concentration is below a target oxygen concentration, fuel injection timing may be retarded to lower the particulate matter. Concurrently, the EGR rate may be decreased to maintain NOx at a target NOx level.

Figure 3:
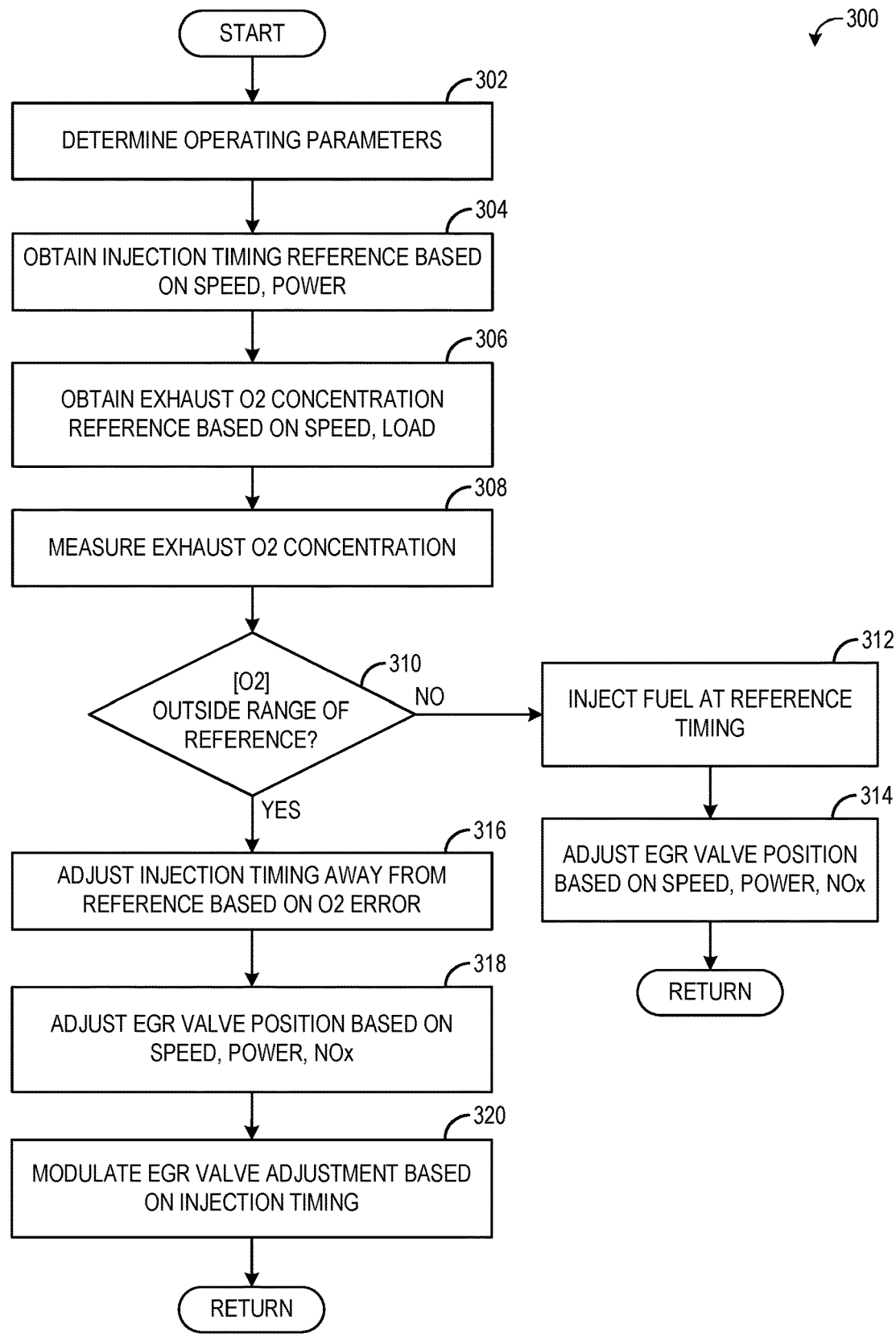
FIG. 3 is a flow chart illustrating a method for adjusting fuel injection timing based on exhaust oxygen levels.
Figure 4:
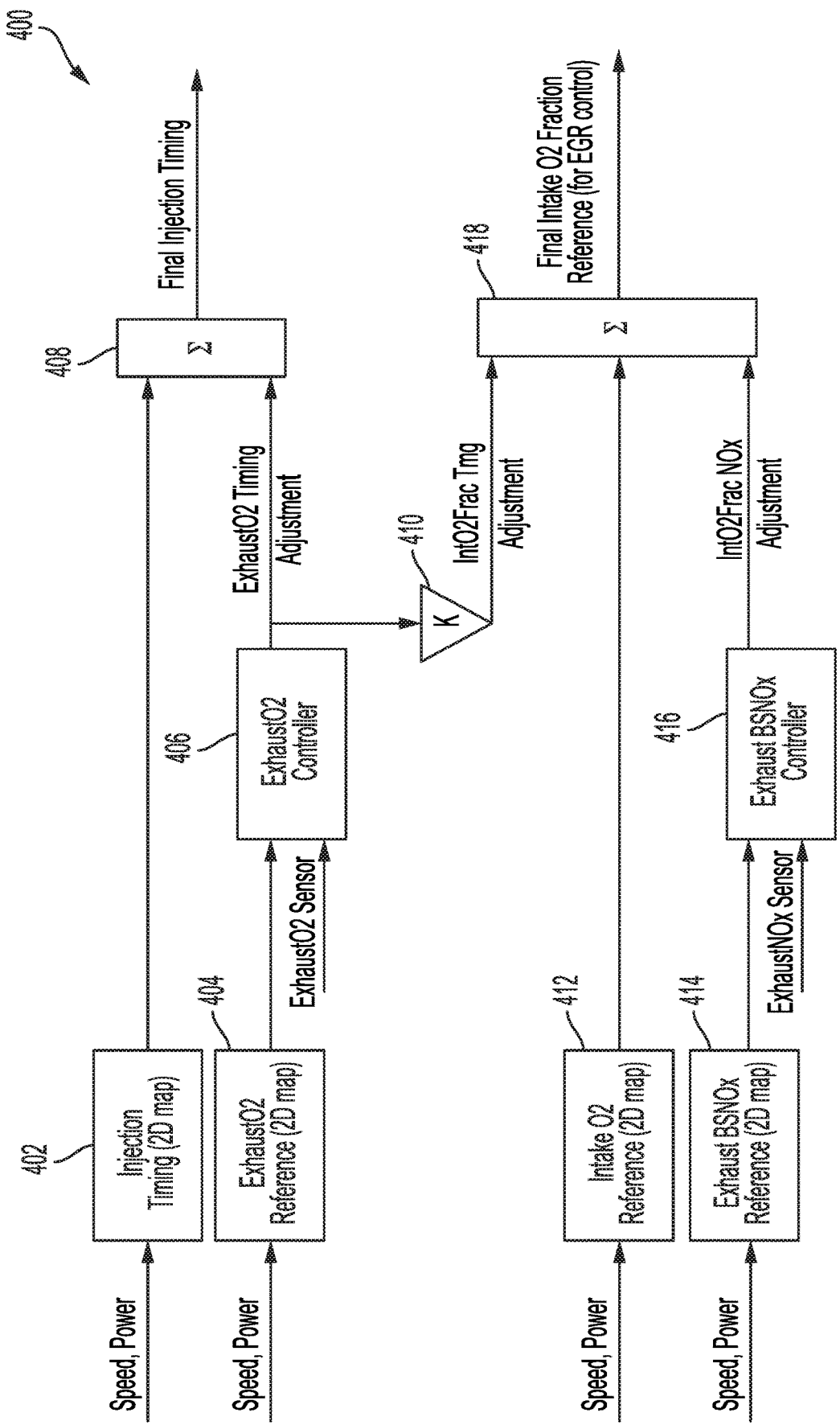
FIG. 4 is a control diagram illustrating engine operation control according to the methods of FIG. 3.

Turning now to FIG. 3, method 300 for controlling emissions is illustrated. Method 300 may be carried out by a controller, such as control unit 180, according to instructions stored in non-transitory memory. At 302, method 300 includes determining engine operating parameters. The determined engine operating parameters may include, but are not limited to, exhaust oxygen and/or NOx concentration (determined from exhaust sensor(s) 186, for example), intake manifold pressure and/or temperature (determined from intake sensor 185, for example), engine speed, engine load, notch or other throttle setting, and/or other parameters.

At 304, method 300 includes obtaining an injection timing reference based on engine speed and engine power (or other suitable parameter, such as engine load or notch throttle setting). At 306, method 300 includes obtaining an exhaust oxygen concentration reference based on engine speed and engine power. Each of the injection timing reference and exhaust oxygen concentration reference may be obtained from a respective look-up table stored in memory of the controller, for example. The exhaust oxygen concentration may include the oxygen concentration of the exhaust gas exiting to atmosphere (e.g., in the "stack" of the vehicle), or may include oxygen concentration at another suitable location, such out of the engine (and before being admitted to a turbocharger or other exhaust system component).

At 308, method 300 includes measuring the exhaust oxygen concentration. The exhaust oxygen concentration may be measured with a suitable sensor, such as sensor 186 of FIG. 1. At 310, method 300 includes determining if the measured oxygen concentration is within a threshold range of the exhaust oxygen concentration reference. In an example, being within the threshold range may include being equal to the reference. In other examples, being within the threshold range may include being within a window around the reference, such as within 1-5% of the reference. In some examples, the exhaust oxygen concentration reference may be a zero value for all engine power/loads below a threshold, and may be a non-zero positive value at maximum engine power/load (such as those observed while operating at a highest notch throttle setting). Thus, in some examples, the measured exhaust oxygen concentration may be equal to or above the reference at nearly all operating conditions other than operation at maximum or near maximum engine power.

If the measured exhaust oxygen concentration is not outside the range of the reference, method 300 proceeds to 312 to inject fuel (e.g., with injector 226 of FIG. 2) at the reference timing. At 314, method 300 includes adjusting a position of one or more EGR valves based on engine speed, engine power, and/or other parameters, such as exhaust NOx concentration. Additional details about the EGR valve control will be provided below with respect to FIG. 4. Briefly, a NOx feedback control loop may be applied to control EGR amounts to maintain combustion stability and reduce NOx emissions. The EGR valve(s) may include valve 163, or the EGR valve(s) may include metering valve 170 and bypass valve 164. Method 300 then returns.

Returning to 310, if the measured exhaust oxygen concentration outside of the range of the reference, method 300 proceeds to 316 to adjust the injection timing away from the reference timing based on an oxygen error. The oxygen error may be the difference between the measured exhaust oxygen concentration and the oxygen reference. If the oxygen error is negative (such that measured oxygen is less than the reference), the injection timing may be retarded, thereby adjusting the injection timing so that fuel is injected later in a given cylinder cycle (e.g., at TDC of the compression/power stroke rather than at 15 crank angle degrees before TDC in the compression stroke). By retarding the injection timing, exhaust oxygen concentration may be increased, thereby lowering particulate matter emissions. However, in some examples, the fuel injection timing may be advanced based on the oxygen error. In some examples, the fuel injection timing may only be adjusted when the oxygen error is negative (e.g., when the measured oxygen is less than the reference) and no fuel injection timing adjustments may occur when the oxygen error is positive (e.g., when the measured oxygen is greater than the reference). The fuel injector(s) (such as injector 226) are controlled to meet the adjusted fuel injection timing, as well as controlled to meet the fuel quantity command. The fuel quantity command may be based on demanded engine power, for example. Further, the fuel timing adjustments made in response to the exhaust oxygen concentration may include only timing adjustments, and not adjustments to the fuel quantity. In this way, fuel injection timing adjustments in response to exhaust oxygen concentration may be made independent of fuel quantity adjustments. The fuel quantity adjustments may be made based on engine power and may not be made based on the exhaust oxygen concentration relative to the reference, at least in some examples.

At 318, method 300 includes adjusting EGR valve position based on engine speed, engine power, and measured NOx. The EGR valve that is adjusted may include EGR valve 163. In engine configurations that include two EGR valves (e.g., valves 164 and 170), both EGR valves may be adjusted to maintain an effective 100% open area across the valves. For example, if the EGR valves are adjusted to increase EGR flow, the EGR metering valve (e.g., valve 170) may be opened by a larger degree (e.g., from 40% open to 60% open) while the EGR bypass valve (e.g., valve 164) may be closed by a corresponding degree (e.g., from 60% open to 40% open). EGR valve position may be controlled to maintain a target intake oxygen fraction (e.g., a fraction of the total intake air mass admitted to the engine that is comprised of oxygen). The target intake oxygen fraction may be based on a reference oxygen fraction that is obtained based on current engine speed and engine power, and the reference oxygen fraction may be adjusted based on output from an exhaust NOx sensor to reach the target intake oxygen fraction. In one example, a NOx reference may be obtained based on engine speed and engine power and the NOx reference may be adjusted based on measured exhaust NOx concentration. The adjusted NOx reference may be used to adjust the intake oxygen reference.

At 320, method 300 includes modulating the EGR valve adjustment based on the adjusted injection timing. As injection timing is adjusted to increase exhaust oxygen concentration, the levels of NOx in the exhaust may also change (e.g., the NOx may decrease as fuel injection timing is retarded). To maintain a steady NOx concentration in the exhaust, the EGR valve(s) may be adjusted, for example to lower EGR amounts and increase the intake oxygen fraction. To modulate the EGR valve adjustment, a gain may be applied to the EGR valve adjustment (where the EGR valve adjustment is based on the intake oxygen reference and exhaust NOx). The gain may be determined based on the level of injection timing adjustment. The gain may represent a predicated translation (gain) from injection timing to intake oxygen fraction, e.g., a prediction of how much the adjustment to the injection timing will affect the intake oxygen fraction. The gain may be obtained from a look-up table stored in memory of the controller, where the gain is indexed as a function of injection timing (e.g., crank angle relative to TDC of the compression stroke), change in injection timing, and/or engine speed and power. The NOx/intake oxygen feedback loop may make up for any inaccuracies in this gain to maintain the target exhaust NOx concentration. By maintaining a steady NOx level, reduced performance in terms of power/fuel economy that may be observed when NOx is below the target may be avoided. Further, fuel economy may be improved by opportunistically lowering EGR when NOx is lowered via the adjustment to the fuel injection timing. Method 300 then returns.

FIG. 4 illustrates a control diagram 400 showing the fuel injection timing and EGR controls discussed above with respect to FIG. 3. Control diagram 400 schematically illustrates various 2D maps, controllers, and summation blocks that may be stored in memory of the controller (e.g., controller 180) and that may execute in order to adjust fuel injection and/or EGR valve position in response to operating parameters (such as exhaust oxygen concentration, engine speed, engine power, etc.).

Control diagram 400 includes an injection timing map 402. Injection timing map 402 may output a base fuel injection timing as a function of engine speed and engine power. The base injection timing output from map 402 may be used at summation block 408 to determine a final injection timing. Control diagram 400 also includes an exhaust (e.g., stack) oxygen reference map 404. Exhaust oxygen reference map 404 may output a reference oxygen concentration based on engine speed and engine power. The output reference oxygen concentration may be supplied to an exhaust oxygen controller 406. The exhaust oxygen controller 406 may also receive a measured exhaust oxygen concentration from an oxygen sensor positioned in the exhaust system. The oxygen controller 406 may compare the measured oxygen concentration with the reference oxygen concentration and output an exhaust oxygen timing adjustment that corresponds to the difference between the measured oxygen concentration and the reference oxygen concentration. In some examples, the oxygen controller 406 may only output an exhaust oxygen timing adjustment when the measured oxygen concentration is less than the reference oxygen concentration.

Summation block 408 may receive the base injection timing and the exhaust oxygen timing adjustment and output a final injection timing based on the base injection timing and the exhaust oxygen timing adjustment. The base injection timing may include a start of injection (SOI) timing relative to piston position. In one non-limiting example, the base injection timing may be represented as degrees relative to a default injection timing. For example, the default injection timing may be at top dead center (TDC) during the compression stroke and the base injection timing may include a number of degrees before (e.g., advance angle) or after (e.g., retard angle) TDC, where advance angle includes a positive value and retard angle includes a negative value. The exhaust oxygen timing adjustment may include an adjustment to the base timing in advance angle or retard angle. For example, the base timing may be 10 (e.g., 10 degrees before TDC) and the timing adjustment may be −3 (e.g., 3 degrees later), resulting in a final injection timing of 7 degrees before TDC.

The exhaust oxygen controller 406 may additionally output a gain 410 that is based on the difference between the measured oxygen concentration and the reference oxygen concentration. The injection timing adjustment that results as a function of the low oxygen concentration in the exhaust may change (e.g., reduce) the NOx output of the engine. To maintain NOx at a target NOx level, the EGR rate may be adjusted by a corresponding amount. To adjust the EGR rate, the gain may be applied to the NOx-feedback control loop EGR control that is executed to control the EGR rate. The gain 410 may include a value that effectively increases or decreases the final intake oxygen fraction reference that is used to adjust the EGR valve(s). The gain may be determined empirically based on engine data and may be stored in a look-up table as a function of engine speed and engine power. By supplying the gain to the summation block 418 (described below), adjustments to the EGR valve position(s) may be made faster than waiting for the NOx feedback loop to detect and react to changes in NOx.

To control the EGR valves, control diagram 400 includes an intake oxygen reference map 412 that outputs an intake oxygen reference value as a function of engine speed and engine power. The intake oxygen reference is supplied to a summation block 418. Control diagram 400 further includes a stack brake specific NOx (BSNOx) reference map 414. BSNOx reference map 414 outputs a BSNOx reference value as a function of engine speed and engine power. The BSNOx reference value is supplied to an exhaust BSNOx controller 416. The BSNOx controller receives output from a NOx sensor indicative of exhaust NOx concentration. The BSNOx controller 416 compares the BSNOx reference to the measured NOx concentration and outputs an intake oxygen fraction NOx adjustment to the summation block 418. In some examples, the BSNOx controller 416 may utilize a corrected (referred to as brake specific) NOx value, in order to account for variations in exhaust NOx concentration that are not due to intake oxygen concentration. The corrected NOx (BSNOx) may be corrected based on humidity, exhaust oxygen concentration, and other parameters. As used herein, BSNOx refers to an exhaust NOx concentration that is normalized to engine output (e.g., engine power represented by horsepower). In this way, the disclosure controls on what is actually limited by the regulation (e.g., humidity corrected brake specific NOx).

At summation block 418, the intake oxygen fraction NOx adjustment output by BSNOx controller 416 may be used to adjust the intake oxygen reference value to account for variations between intake oxygen concentration and exhaust NOx. In this way, the EGR valve(s) may be controlled based on a target intake oxygen fraction in a manner that results in target exhaust NOx being maintained. The gain 410 may be applied in summation block 418 to modulate the adjustment to the intake oxygen fraction. For example, an initial intake oxygen reference may be determined by a suitable combining of the intake oxygen reference output by map 412 and the intake oxygen fraction NOx adjustment output by controller 416 (e.g., the two values may be added or multiplied). Then, the gain 410 may be combined with the initial intake oxygen reference (e.g., added or multiplied) to arrive at the final intake oxygen fraction reference. In other examples, the gain 410 may be applied to the intake oxygen fraction NOx adjustment in order to modulate how much the intake oxygen fraction NOx adjustment actually adjusts the intake oxygen reference value. The final intake oxygen fraction reference may be supplied to an EGR controller (not shown), which may adjust EGR valve position to maintain intake oxygen at the final intake oxygen fraction reference.

For example, the final intake oxygen fraction reference may be converted to an EGR flow reference at the EGR controller. This may include determining the EGR flow based on the intake oxygen fraction reference, a fresh air flow model, and fuel quantity command. Actual EGR flow may be determined based on exhaust oxygen and other parameters, such as intake manifold temperature, manifold pressure, speed, and fuel quantity. The EGR valve(s) are adjusted based on the error between the EGR flow and EGR flow reference values determined above.

Thus, the method illustrated in FIG. 3, which may be carried out at least part according to the control diagram illustrated in FIG. 4, monitors exhaust oxygen concentration as an indicator for particulate matter production. During vehicle operation, engine air-fuel ratio may decrease due to wear of the engine system (e.g., due to calibration drift, air leakage into the charged air system, or increased charted air temperature due to intercooler and/or EGR cooler fouling) or due to ambient conditions, such as operation at high altitude or operation in an oxygen-poor environment (e.g., a tunnel). The fuel-rich, oxygen-poor cylinder conditions lead to increases in particulate matter production and decreases in exhaust oxygen concentration.

To mitigate this increase in particulate matter production, the exhaust oxygen concentration is monitored and compared to a reference oxygen concentration. If the exhaust oxygen concentration falls below the reference oxygen concentration (or meets another condition relative to a threshold, such as does not exceed the reference oxygen concentration or does not exceed the reference oxygen concentration by at least a threshold amount), fuel injection timing may be adjusted (e.g., retarded) to increase oxygen concentration, thereby lowering particulate matter production. Because fuel quantity may be controlled based on engine power, intake oxygen fraction, or other parameters and not based on exhaust oxygen concentration, the fuel timing adjustments may be performed independently of fuel quantity adjustments, and the fuel injection timing may be adjusted without adjusting the fuel quantity.

The retarding of the fuel injection timing also acts to lower NOx concentration in the exhaust gas. While NOx reduction may be desirable, simply allowing the NOx to be reduced unabated (e.g., while still flowing a relatively high amount of EGR, such as the amount demanded to maintain NOx at the target without the fuel timing adjustment) may disrupt other engine controls and/or may negatively impact performance and/or fuel economy. Thus, a concurrent increase in EGR amounts may accompany the adjustment to the injection timing. The EGR amount may be reduced by adjusting a target intake oxygen fraction (e.g., increasing the target) by an amount that is based on the adjustment to the injection timing. The adjustment to the target intake oxygen fraction results in a reduction in EGR amount, as the EGR valve(s) is controlled to maintain intake oxygen at the target intake oxygen fraction.

Figure 5:
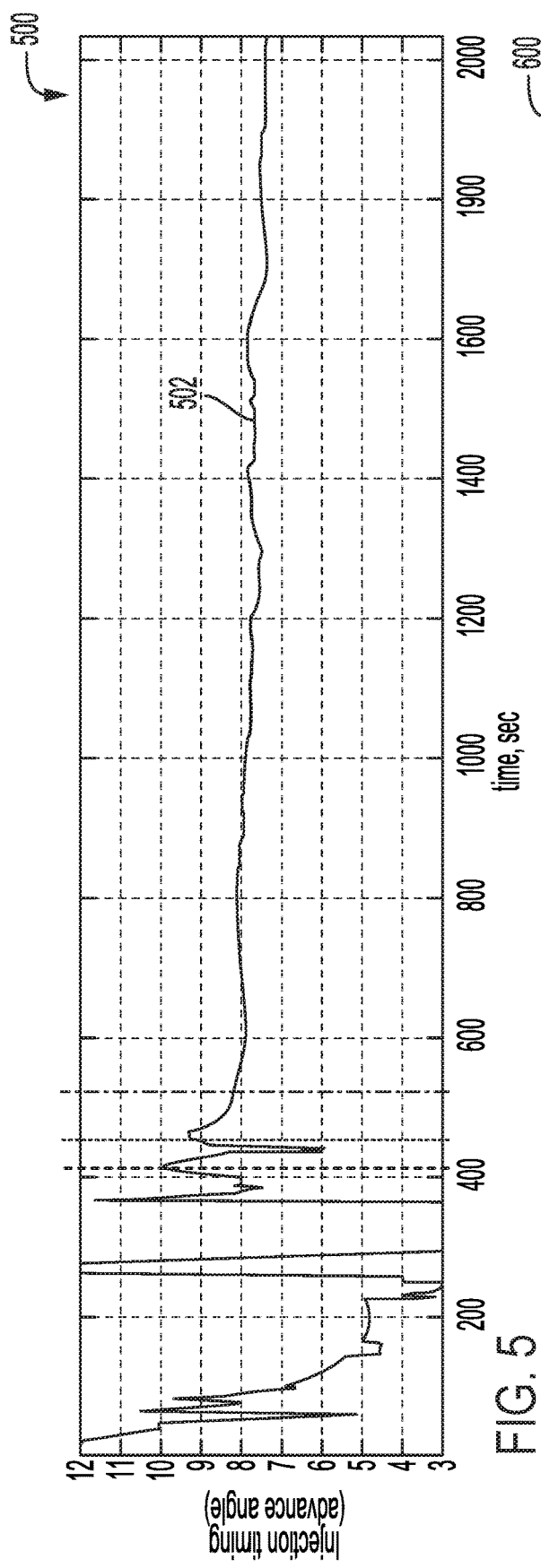
Figure 6:
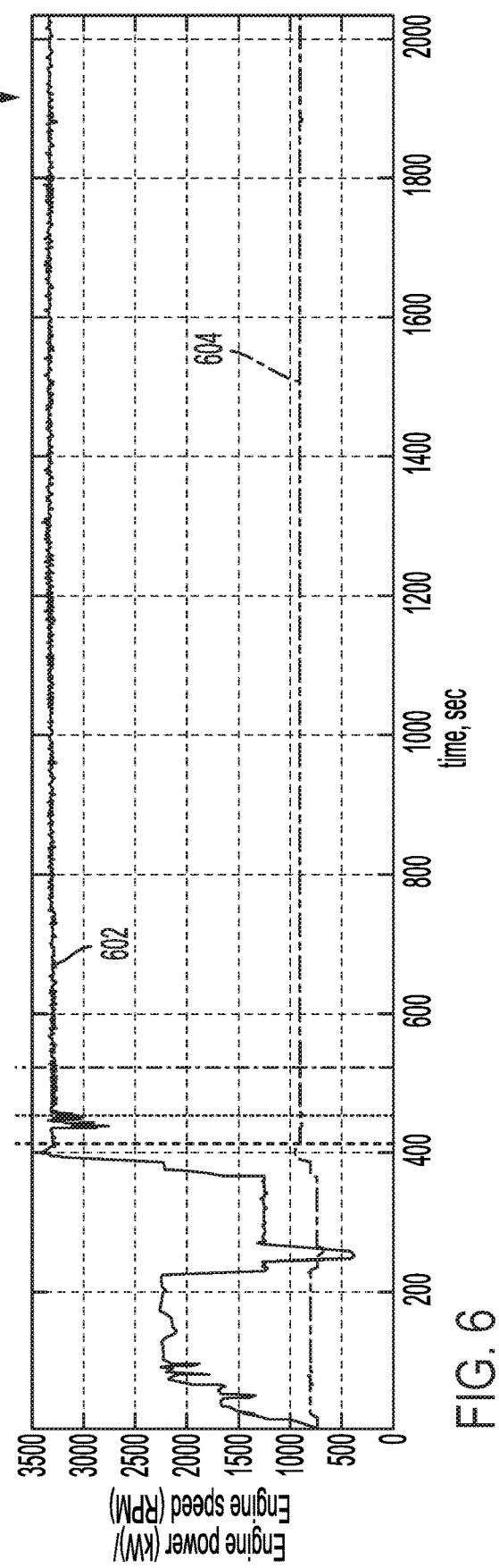
Figure 7:
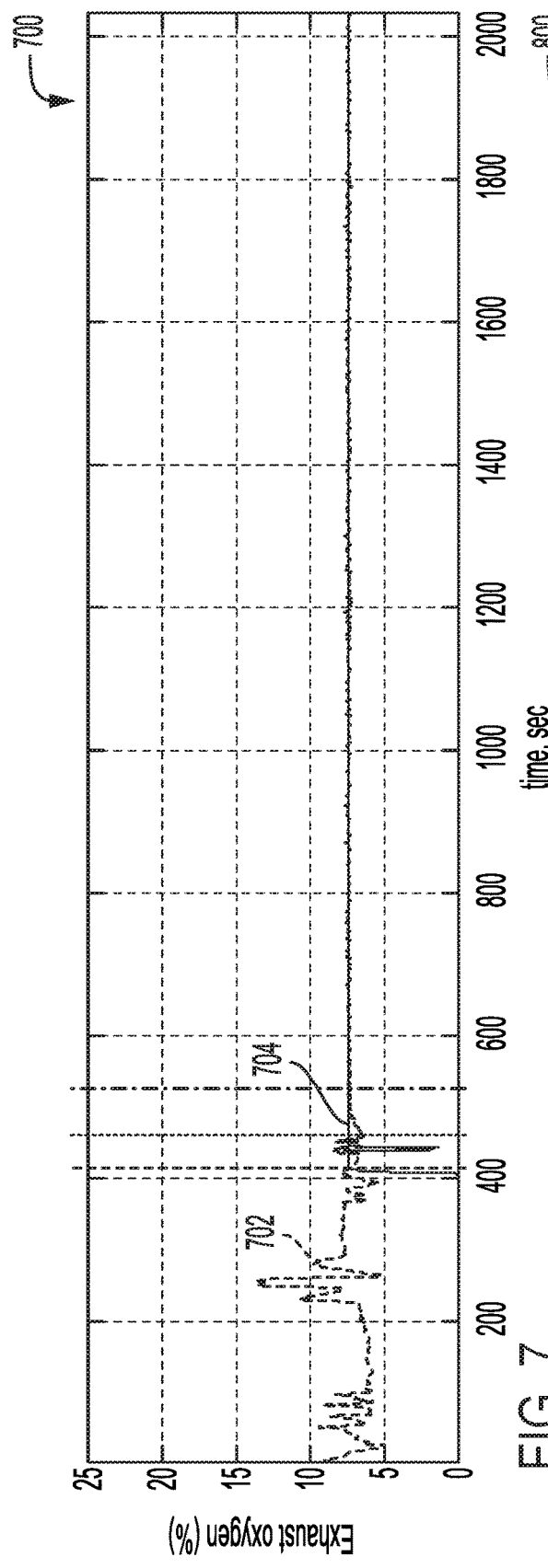
Figure 8:
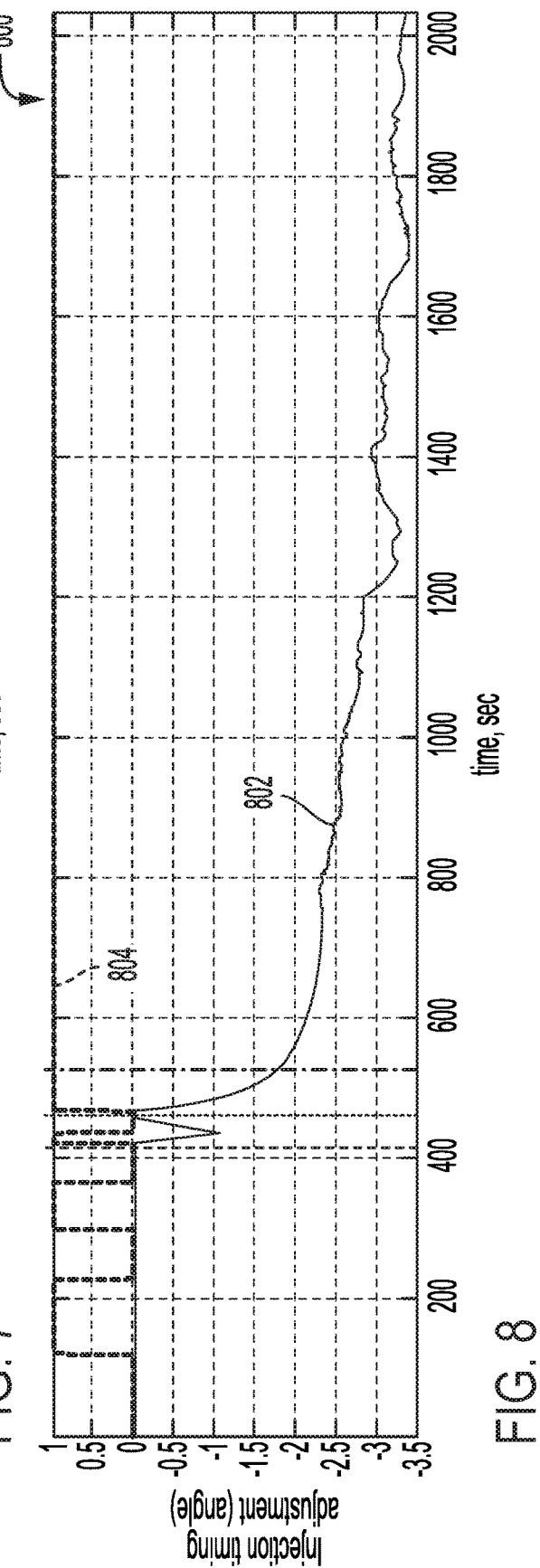

FIGS. 5-10 show example operating parameters that may be observed during execution of the method of FIG. 3 and/or when fuel injection and EGR valve position are adjusted according to the control diagram of FIG. 4. FIG. 5 shows a first plot 500 of fuel injection timing, FIG. 6 shows a second plot 600 of engine power and engine speed, FIG. 7 shows a third plot 700 of exhaust oxygen concentration, FIG. 8 shows a fourth plot 800 of injection timing adjustment, FIG. 9 shows a fifth plot 900 of intake oxygen fraction, and FIG. 10 shows a sixth plot 1000 of EGR valve position. Each plot shown in FIGS. 5-10 includes the respective parameters plotted as a function of time (shown on the x-axis of each plot), and each of the plots are time-aligned such that a given time point (e.g., 100 seconds) in the first plot corresponds to the same time point on each other plot.

Referring to FIG. 6, plot 600 shows both engine power (shown by curve 602) and engine speed (shown by curve 604). Between 0 and 400 seconds, the vehicle may be gaining speed as the vehicle approaches a target speed. As a result, engine power increases from a relatively low starting power (e.g., of 300 kW) to a maximum power (e.g., of 3300 kW). Engine speed remains relatively steady (e.g., around 800 RPM), other than a slight increase (e.g., to 900 RPM) immediately prior to 400 seconds. Thus, before 400 seconds, the engine may be operating in non-steady state conditions.

As a result of the non-steady state conditions and due to the lower engine power prior to 400 seconds, the exhaust oxygen concentration reference (shown by curve 704 of FIG. 7) may be zero. Thus, fuel injection timing, intake oxygen fraction, and EGR valve position may be controlled independently of the exhaust oxygen concentration, and no adjustment to the fuel injection timing based on exhaust oxygen concentration is performed. For example, prior to 400 seconds, the fuel injection timing adjustment (shown by curve 802 of FIG. 8) may be zero.

Around 400 seconds, the engine power stabilizes at the maximum power (e.g., at the highest notch throttle setting) and engine speed remains constant. Thus, the engine is operating at steady-state and engine power is at maximum power. As a result, the exhaust oxygen concentration reference (shown by curve 704) increases from zero to a positive value, herein shown as 7.5%.

Immediately following the increase in the exhaust oxygen reference, around 410 seconds (noted in FIGS. 5-10 by a first, dashed line), the measured exhaust oxygen concentration is below the exhaust oxygen reference (the measured exhaust oxygen concentration is shown by curve 702 of FIG. 7, which is the dashed curve). Thus, a fuel injection timing adjustment (other than zero) is generated, shown by curve 802. The fuel injection timing adjustment shown by curve 802 may be a timing adjustment to the main fuel injection event of a cylinder cycle. In some examples, only the main injection event timing may be adjusted. In other examples, both the main injection event timing may be adjusted and one or more pilot fuel injection event timings may be adjusted. The fuel injection timing adjustment initially includes an adjustment of −1 degrees, jumps back to zero temporarily, and then, starting around 450 seconds (noted in FIGS. 5-10 as a second, dotted line) decreases toward −3 degrees. (The engine power temporarily drops around 425 seconds, which results in some variation in the oxygen reference and hence the timing adjustment.) Curve 804 of FIG. 8 shows fuel timing controller activation, e.g., when the controller is allowed to suggest a timing adjustment based on exhaust oxygen measurement, which is based on operating conditions (e.g., engine power).

The fuel injection timing adjustment is applied to the fuel injection timing for the main fuel injection event, and thus fuel injection timing (shown by curve 502) tracks the injection timing adjustment (e.g., the fuel injection timing is retarded from an advance angle of 10 to an advance angle of 6, advances back to an angle of 9 around 450 seconds, and then steadily retards towards an angle of 8). The exhaust oxygen concentration begins to increase around 450 seconds (as shown by curve 702 of FIG. 7). Around 500-550 seconds, noted in FIGS. 5-10 approximately by the third, dashed-dotted line, the exhaust oxygen concentration reaches the exhaust oxygen reference.

The EGR valves are controlled along with the fuel injection timing retard in order to maintain exhaust NOx at the NOx target. As shown in FIG. 10, starting at 450 seconds, the EGR metering valve position (shown by curve 1002) moves to a more closed position, thereby reducing the flow of exhaust gas from the donor cylinders to the engine. The EGR bypass valve position (shown by curve 1004) moves to a more open position, thereby supplying more exhaust gas from the donor cylinders to the exhaust system and eventually to atmosphere. As appreciated by FIG. 9, the intake oxygen fraction (shown by curve 902) initially decreases but then begins to increase (e.g., starting around 450 seconds) and tracks a reference intake oxygen fraction shown by curve 904.

As appreciated by FIGS. 7 and 8, the adjustment to the fuel injection timing maintains the exhaust oxygen concentration at the reference oxygen concentration. However, the fuel injection timing adjustment continues to decrease (retard the injection timing more) even after the time that the exhaust oxygen concentration reaches the reference oxygen concentration, e.g., due to other changing parameters including ambient conditions such as temperatures, or temperatures/pressure within the engine.

A technical effect of responding to a sensed exhaust oxygen concentration by changing a fuel injection timing, and then adjusting an exhaust gas recirculation (EGR) amount based on NOx sensor output and based on the change in fuel injection timing is that particulate matter production may be decreased without increasing NOx output or fuel consumption.

In another representation, a system includes an engine; one or more sensors; and a controller, wherein the controller is configured to a receive a first sensor signal from the one or more sensors indicative of a sensed exhaust oxygen concentration of exhaust of the engine and a second sensor signal from the one or more sensors indicative of a NOx level, and wherein the controller, responsive to the first sensor signal, is configured to change a fuel injection timing of the engine to maintain particulate matter (PM) within a range, and then to adjust an exhaust gas recirculation (EGR) amount of the engine based on the second sensor signal and based on the change in fuel injection timing.

In another representation, a method includes, with one of more sensors operably coupled to an engine, generating a first sensor signal indicative of a sensed exhaust oxygen concentration of exhaust of the engine and a second sensor signal indicative of a NOx level; and, with a controller, responsive to (e.g., and/or based on) the first sensor signal, changing a fuel injection timing of the engine to maintain particulate matter (PM) within a range, and then adjusting an exhaust gas recirculation (EGR) amount of the engine based on the second sensor signal and based on the change in fuel injection timing.

In another embodiment, a method includes, with a controller, receiving a signal from an exhaust oxygen sensor positioned in an exhaust system coupled to an engine; the signal is indicative of an exhaust oxygen concentration measured by the exhaust oxygen sensor. The method further includes, with the controller, adjusting fuel injection timing of the engine responsive to the exhaust oxygen concentration being below a reference exhaust oxygen concentration, while also adjusting an intake oxygen fraction in an intake system coupled to the engine.

In another embodiment, a system includes a controller and an exhaust oxygen sensor. The exhaust oxygen sensor is operably disposed in an exhaust system of an engine. The controller is configured to control retarding fuel injection timing responsive to an exhaust oxygen concentration of exhaust gas expelled by the engine measured by the exhaust oxygen sensor being below a reference exhaust oxygen concentration, and to also control (e.g., concurrently with the fuel injection timing being retarded) increasing an intake oxygen fraction of intake air admitted to the engine.

In another representation, a method includes, with a controller, and responsive to a sensed exhaust oxygen concentration, changing a fuel injection timing to maintain particulate matter (PM) within a range; and then, with the controller, adjusting an exhaust gas recirculation (EGR) amount based on NOx sensor output (e.g., feedback) and based on the change in fuel injection timing.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
retarding fuel injection timing responsive to an exhaust oxygen concentration of exhaust gas expelled by an engine measured by an exhaust oxygen sensor being below a reference exhaust oxygen concentration, while also increasing an intake oxygen fraction of intake air admitted to the engine.

2. The method of claim 1, wherein increasing the intake oxygen fraction of intake air admitted to the engine comprises reducing a flow of exhaust gas recirculation (EGR) from the engine to an intake system coupled to the engine.

3. The method of claim 2, further comprising closing a first EGR valve controlling flow of exhaust gas from the engine to the intake system and opening a second EGR valve controlling flow of exhaust gas from the engine to an exhaust system coupled to the engine to reduce the flow of EGR from the engine to the intake system.

4. The method of claim 1, wherein increasing the intake oxygen fraction of the intake air comprises increasing the intake oxygen fraction by a first amount based on a second amount that the fuel injection timing is retarded.

5. The method of claim 1, wherein retarding fuel injection timing comprises retarding fuel injection timing relative to a base injection timing that is based on engine speed and engine power.

6. The method of claim 1, wherein retarding fuel injection timing comprises retarding fuel injection timing independent of a fuel injection quantity adjustment.

7. The method of claim 1, wherein the fuel injection timing is not retarded responsive to the exhaust oxygen concentration being above the reference exhaust oxygen concentration.

8. The method of claim 1, wherein the reference exhaust oxygen concentration is based on engine power.

* * * * *